Dec. 2, 1969 G. V. MARCELL 3,481,802

METHOD AND APPARATUS FOR PREPARING MULTI-CONDUCTOR CABLE WITH FLAT CONDUCTORS

Filed Sept. 26, 1966

INVENTOR.

GERALD V. MARCELL

BY Adams, Curayna & Haugen

ATTORNEYS

United States Patent Office 3,481,802
Patented Dec. 2, 1969

3,481,802

METHOD AND APPARATUS FOR PREPARING MULTICONDUCTOR CABLE WITH FLAT CONDUCTORS

Gerald V. Marcell, Northfield, Minn., assignor to G. T. Schjeldahl Company, Northfield, Minn., a corporation of Minnesota Filed Sept. 26, 1966, Ser. No. 581,843
Int. Cl. H01b *13/06, 13/22*
U.S. Cl. 156—52 6 Claims

ABSTRACT OF THE DISCLOSURE

A method and apparatus for preparing flat conductor cable having a plurality of ribbon-like conductors disposed upon and adhesively bonded to the surface of a substrate wherein the conductors are brought into contact with the substrate surface, and while maintained in axial tension on said substrate, the combination is seated on a yieldably compressible layer to permit the conductor to become embedded into the surface of the substrate film.

Figure 1:
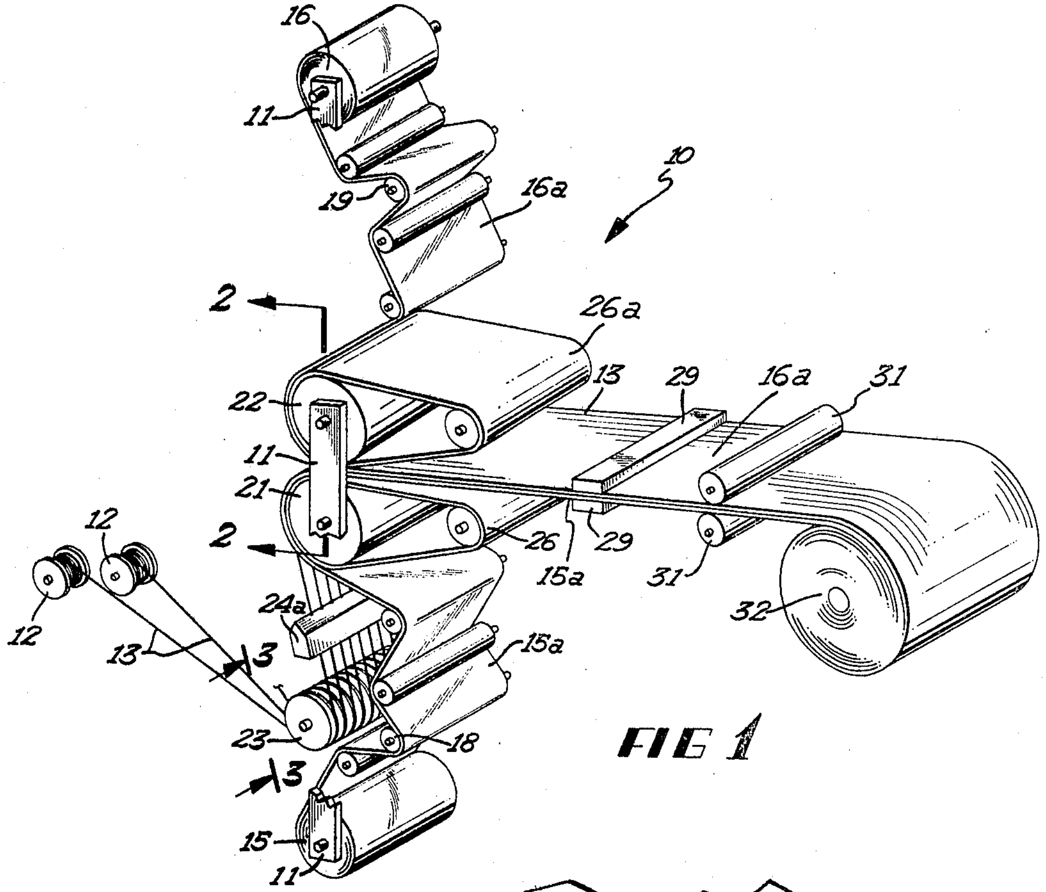

The invention described herein was made in the performance of work under a NASA contract and is subject to the provisions of section 305 of the National Aeronautics and Space Act of 1958, Public Law 85–568 (72 Stat. 435; 42 U.S.C. 2457).

The present invention relates generally to the preparation of an electrical cable of the flat cable type wherein the individual conductors are arranged in a planar configuration in a relatively high density pattern. Generally, these conductors are substantially rectangularly shaped ribbon-like members having a pair of relatively broad surfaces, and having a relatively small cross-sectional dimension. The electrical cable product which is formed in accordance with the present invention is preferably substantially flexible and have the individual conductors arranged in generally parallelly disposed relationship between a substrate member and a coverlay member.

In accordance with the present invention, the substrate member is provided, along one surface, with a heat softenable adhesive bonding film which is compatible with the substrate, and also with the conductors, these conductors preferably and generally being copper. The substrate is passed along the surface of a heated member until the adhesive bonding film is rendered somewhat soft and pliable. The individual ribbon-like conductors are then brought into contact with the bonding film and by means of tension or other forces, the ribbon-like conductors are forced or urged against the adhesive bonding film and generally embedded therein. While this embedding is accomplished generally by the softened condition of the adhesive bonding film, it is a feature of the invention that the substrate be backed by a yieldable, compressible member such as, for example, blotter paper of the like. Because of heat transfer conditions, a layer of blotter paper of about 20 mils in thickness has been found to be extremely satisfactory. After the individual conductors have been properly embedded within the surface of the heat softenable adhesive bonding film, the substrate, conductors, and a coverlay film are then passed through a nip zone between a pair of pressure members, and the individual components form a laminate structure therefrom. As indicated in the drawings, the system preferably utilizes a pair of heated rollers which rollers form both the heated surface covered by a yieldable and compressible member, and also conveniently form a pressure nip zone. Also, it will be appreciated that in this aspect, the rollers will be heated, and the dwell time of the substrate material on the surface is sufficient to permit the adhesive bonding film to become moderately softened.

The availability of the yieldable, compressible surface together with the softened adhesive bonding film permit the individual conductors to become embedded into the softened adhesive film and thereby arrange some significant flow of the adhesive bonding film around the edge surfaces of the individual conductors. It is the availability of this adhesive along the edge surfaces of the conductors which has been found to provide for a firm establishment of the conductor in a pre-determined point along the surface of the substrate, this arrangement eliminating the danger of relative movement or slippage of the conductors during subsequent processing operations, including, for example, the application of a second or coverlay film over the surfaces of the individual conductors and the substrate member. After the subsequent operations, the adhesive material is cured to its final cured stage.

Therefore, it is an object of the present invention to provide an improved apparatus and technique for preparing electrical cable of the flat cable type wherein the individual conductors are arranged in a generally parallelly disposed relationship, one to another.

Yet it is a further object of the present invention to provide an improved apparatus and technique for the preparation of electrical cable of the flat cable type wherein the individual conductors are arranged in a high density pattern.

It is yet a further object of the present invention to provide an improved apparatus and technique for preparing electrical cable utilizing generally flat, ribbon-like conductors, these conductors being arranged in a generally parallel, non-distorted pattern, and in high density.

Figure 2:
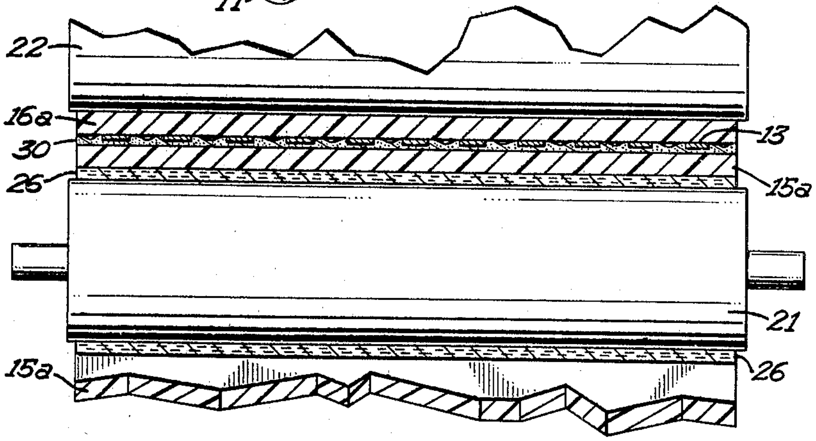
Figure 3:
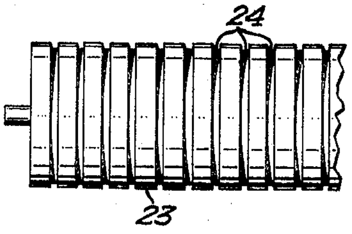

Other and further objects of the present invention will become apparent to those skilled in the art upon a study of the following specification, appended claims and accompanying drawings, wherein:

FIGURE 1 is a perspective view showing a typical arrangement of apparatus which may be utilized to prepare flexible electrical cable with a plurality of ribbon-like conductors arranged in generally parallel relationship;

FIGURE 2 is a detailed view of the nip portion of the laminating rolls of the apparatus shown in FIGURE 1, and illustrating, in section, the cable as it is entering the nip portion of the rolls, the rolls being shown on a somewhat enlarged scale, with the component portions of the cable being shown on a substantially enlarged scale and with the compressible backing being shown on the bottom roll only; and FIGURE 3 is a detail elevational view of a guide roller taken normal to the roller axis and along the line and in the direction of the arrows 3—3 of FIGURE 1.

In accordance with the preferred modification of the present invention, and with particular attention directed to the apparatus shown in FIGURE 1, the cable-laminating machine generally designated 10 comprises a suitable framing assembly 11 including means for retaining a plurality of supply spool members 12—12 which carry the individual conductors such as the flat ribbon conductors 13—13. The supply spools 12—12 are, of course, journaled for appropriate rotation along the frame member 11. If desired, appropriate drag devices or tension control devices may be employed in combination with the supply spools 12—12 in order to assist in appropriately guiding the individual flat ribbon-like conductors during the encapsulation or mounting process. The assembly 10 further includes a pair of supply rolls 15 and 16 for carrying and supplying substrate and coverlay films respectively, these supply rolls also being journaled for rotation within the frame means 11. Again, if desired, appropriate drag or tension-control means may be utilized in connection with the supply rolls 15 and 16 in order to appropriately deliver the material to the various processing stations of the apparatus.

As indicated, a pair of tension regulating systems may be employed in connection with the film supply rolls 15 and 16, such as is shown at 18 and 19. The individual rollers 18 and 19 are arranged to provide the desired tension on the film supply portions of the system.

As shown in FIGURE 1, a pair of laminating rollers 21 and 22 are arranged in axially parallel relationship, these rollers 21 and 22 being journaled for rotation within the frame 11. Suitable drive means, not shown, are provided for the individual laminating rollers, this drive means preferably comprising a chain drive assembly which will assist in driving the individual rollers 21 and 22 at appropriately controlled speeds so that the individual peripheral velocities are substantially equal. The individual rolls 21 and 22 are preferably provided with means for heating the peripheral surfaces thereof, the heating means preferably including a temperature control system for providing reasonably close control of the surface temperatues.

With attention now being re-directed to the conductor supply arrangement, a guide roller 23 is shown between the laminating rollers 21 and 22 and the individual supply spools 12—12, this guide roll 23 being disposed close to the nip and being provided with appropriately spaced grooves 24—24, these grooves being adapted to receive the individual flat ribbon conductors therein, and being spaced apart in accordance with the desired conductor spacing on the cable product. An auxiliary guide may be employed as shown at **24*a*** in order to control the feed of the conductors to the laminating rollers.

It will be observed in connection with FIGURE 1 that the substrate and coverlay films pass across the heated laminating rollers 21 and 22 for a distance of about 180 degrees of arc prior to reaching the nip portion of the rollers 21 and 22. In addition, it will be observed that the individual conductors 13—13 move across a distance of about 90 degrees of arc while in contact with the surface of the substrate **15*a*. With further attention being directed to the nip portion of the laminating rollers, it will be observed that a compressible member 26 is interposed between the surface of the laminating roller 21 and the substrate 15*a*. This compressible material is necessarily one which is reasonably thermally conductive, and it has been found that blotter paper having a thickness of about .020 inch is preferred. In this connection, the blotter paper is compressible and sufficiently thermally conductive so as to permit compression of the paper with an accompanying transfer of heat therethrough. A compressible material is desired in this application since a material which is merely resilient or deformable may cause anomalous characteristics to occur in the laminated product due to the possible creation of different relative speeds at the surfaces of the individual rollers 21 and 22. It is sometimes desirable for uniformity to utilize a similar or matching material along the top roll, such as, for example, a similar blotter paper roll system as shown at 26*a*. In order to retain the individual conductors in place on its surface, the substrate 15*a* is provided with a film of a heat softenable adhesive bonding material along one surface thereof, this film of heat softenable adhesive bonding material being shown at 30. Thus, as the substrate material 15*a* moves across the approximate 180 degrees of arc on the heated roller 21, this film of heat softenable adhesive bonding material is softened and permits the individual conductors 13—13 to become embedded therein, such as is illustrated in some detail in FIGURE 2. Heat softenable adhesives, such as, for example, polyester base adhesives are generally useful and are widely commercially available. It will be recalled that the individual conductors 13—13 leave the supply spools 12—12 under tension, and thus this tension in the individual conductors 13—13 is reflected in an embedding of the conductors into the adhesive film with a consequent flow of the softened adhesive therearound. Thus, it will be observed that the sequence of events includes an original softening of the adhesive film 30 on the surface of the substrate 15*a*, this accommodating an embedding of the individual conductors within the adhesive film surface. The availability of the compressible layer 26 between the heated roll 21 and the substrate 15*a* enhances the ability of the individual conductors to become embedded in the adhesive film 30 and also enhances the flow of the softened adhesive about the surface of the individual conductors 13—13. At the point of time when these embedded conductors laying upon the surface of the substrate 15*a* enter the nip between the rollers 21 and 22, any tendency for migration of the adhesive film 30 will normally be retarded because of the embedded disposition of the conductors 13—13 therein. Thus, the coverlay film 16*a* may be effectively bonded to the surface of the adhesive film 30 without causing movement or motion to occur between the conductors 13—13**. Thus, a carefully controlled cable may be produced having lines arranged in parallelly disposed relationship, and in carefully controlled spaced relationship. It will be appreciated that flat conductor cable having carefully controlled inter-conductor spacings is highly desirable from the standpoint of uniform electrical properties.

After the product leaves the laminating rollers 21 and 22, it passes through a cooling chamber 29, and thereafter may be cut, slit, or otherwise treated by the slitters (not shown). Draw rolls 31—31 carry the material to a take-up roll 32. The take-up roll 32, which is also journaled for rotation within the frame assembly 11, may also provide drive means, not shown, in order to take up the product thereon.

Thus, in accordance with the apparatus and technique of the present invention, a highly desirable electrically conductive flat conductor cable having a plurality of ribbon-like conductors disposed upon and adhesively bonded to the surface of an insulating substrate member may be prepared. In addition, this electrically conductive flat conductor cable may be provided with a coverlay member to appropriately encapsulate the conductors between a pair of insulating films, as is normally desired in practice. The flat ribbon-like conductors are generally formed of copper having a thickness of from about 1 to 5 mils and having a width of from about 1/16 to about 1/4 inch.

It will be appreciated that the specific examples provided herein are for purposes of illustration only, and that those individuals skilled in the art may depart from these specific illustrations without actually departing from the spirit and scope of the present invention.

What is claimed is:

1. An apparatus for producing electrically conductive flat conductor cable having a plurality of ribbon-like conductors disposed upon and adhesively bonded to the surface of an insualting substrate member, said apparatus comprising:

(a) means for retaining a supply of ribbon-like conductors;

(b) first and second rollers having their axes arranged in generally parallelly disposed relationship and forming a nip area at a certain first arcuate position between the surfaces thereof, at least the first of said rollers having means for heating the surface thereof;

(c) means for retaining a supply of generally flexible substrate film and for directing said film to the nip area;

(d) a yieldably compressible layer disposed along the surface of at least one of said rollers and arranged for arcuate movement therewith;

(e) means for directing said conductors on to the surface of said rollers under tension to deform said yieldably compressible layer, said conductor directing means being arranged to bring said conductors into contact with the peripheral surface of said first roller at a second arcuate position spaced a substantial arcuate distance from said nip area.

2. The apparatus as defined in claim 1 being particularly characterized in that said substantial arcuate distance is about 90 degrees.

3. A method of preparing electrically conductive flat conductor cable having a plurality of ribbon-like conductors disposed upon and adhesively bonded to the surface of an insulating substrate member, within a laminating apparatus having a zone with a pair of pressure members arranged on opposite sides of the nip zone, said method comprising:

(a) moving a first substrate film having a heat softenable adhesive bonding film along one surface thereof along a certain path through a heating zone until said bonding film is softened;

(b) bringing a plurality of tension stressed ribbon-like conductors into contact with said bonding film on said substrate film, and then maintaining the tension stressed contact therebetween while said bonding film is being maintained in softened condition, while said conductors are being urged against said substrate surface by said applied tension stress, and while said substrate is being backed by a yieldable compressible member;

(c) thereafter bringing a coverlay film into superimposed relationship with said substrate and with said conductors; and thereafter (d) passing said substrate, conductors and coverlay materials through a nip zone to form a laminate structure.

4. The method as set forth in claim 3 being particularly characterized in that said substrate film, said conductors, and said coverlay film are supplied to said laminating apparatus in roll form, the completed laminate structure being removed from said laminating apparatus and accumulated on a take-up roll.

5. The method as set forth in claim 3 being particularly characterized in that said yieldable compressible member is carried along the surface of one of said pressure members.

6. The method as set forth in claim 3 being particularly characterized in that said substrate is brought into contact with said heated pressure member at a first point of time, and said conductors are brought into contact with the surface of said substrate following a finite lapse of time.

References Cited

UNITED STATES PATENTS

| | | | |
|---|---|---|---|
| 3,068,135 | 12/1962 | Bower | 156—179 |
| 3,239,396 | 3/1966 | Bohannon | 156—52 |
| 3,265,548 | 8/1966 | Harkins et al. | 156—298 X |
| 3,270,122 | 8/1966 | Binek | 156—52 X |
| 3,380,867 | 4/1968 | Morey | 156—179 |

HAROLD ANSHER, Primary Examiner

T. R. SAVOIE, Assistant Examiner

U.S. Cl. X.R.

156—179, 436, 161; 174—117